May 25, 1937.  O. F. GRAEBNER  2,081,810
VEHICLE BODY PILLAR
Filed July 22, 1932
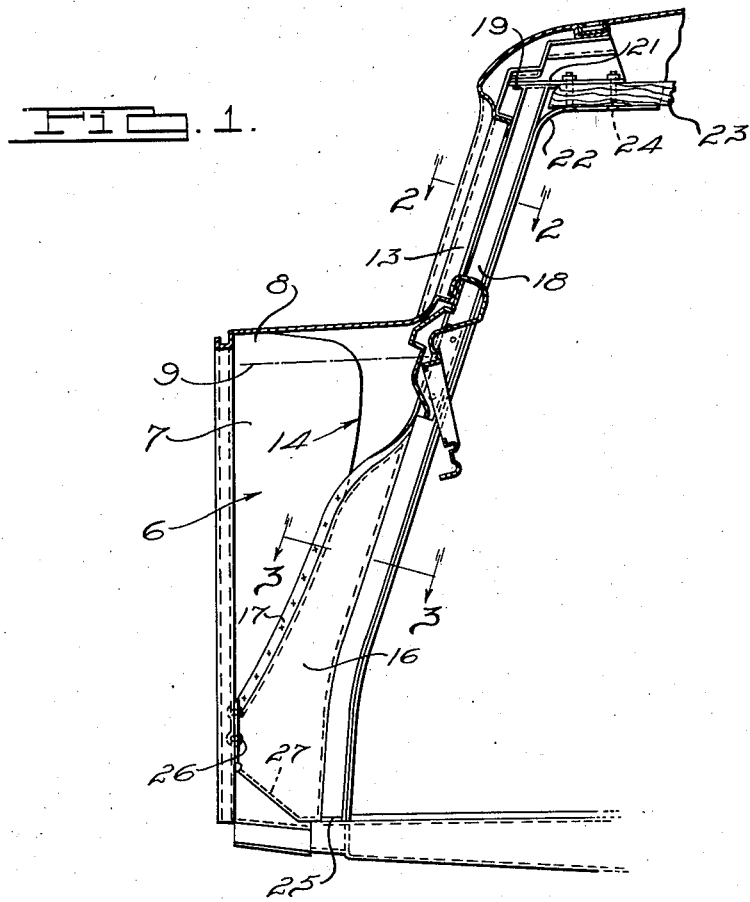
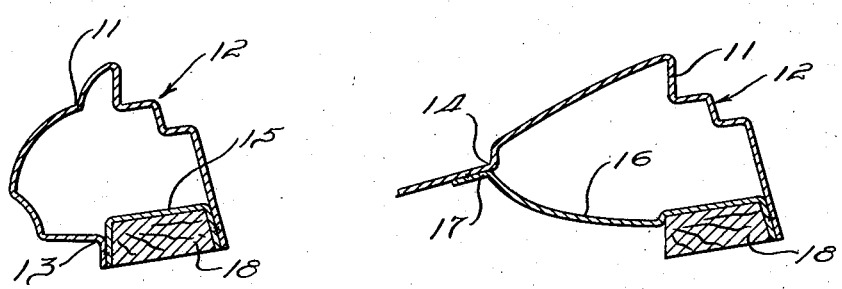
INVENTOR
Otto F. Graebner.
BY
ATTORNEYS.

Patented May 25, 1937

2,081,810

UNITED STATES PATENT OFFICE 2,081,810

VEHICLE BODY PILLAR

Otto F. Graebner, Detroit, Mich., assignor to The Murray Corporation of America, a corporation of Delaware Application July 22, 1932, Serial No. 624,032

6 Claims. (Cl. 296—28)

My invention relates to vehicle bodies and particularly to a pillar element for the cowl of a vehicle body which considerably simplifies the body construction and materially strengthens the cowl and pillar elements.

It is the practice when forming the cowl of a vehicle body, to stamp the two side members from sheet material and preform them to constitute the side portions of the cowl and the pillar at the door and windshield openings and to interconnect the two elements thus formed by a third central panel to constitute the cowl structure. A reinforcing element was utilized for strengthening the paneling at the door and window openings, all of which has been described and claimed in the patent to Vehko No. 1,856,006, dated April 26, 1932, and assigned to the assignee of the present invention.

In practicing my present invention, I so construct the cowl as to provide pillar finish elements at the door opening which slopes frontwardly from the top of the windshield opening. The panel is extended laterally to form the door jamb in the face of which rabbets are provided. Rabbets are also provided in the top and sides of the cowl which substantially follows the slope of the door pillar panel. Pillar members are encompassed by the finish elements at the window opening and are extended frontwardly therebelow to join the sloping rabbets of the cowl. The pillar members are welded or otherwise secured to the pillar finish elements and have secured in the channel section thereof tacking strips which follow the line of the door openings. The pillar members are provided with flanges at the top which join the side roof rails and are similarly flanged at the bottom for engagement with the toe board bracket and the body rail to provide additional support for the cowl and dash panel. The box section structure formed by the extension of the pillar member along the sides of the cowl adds considerable strength thereto, not provided heretofore by the members employed at the door openings.

Accordingly, the main objects of my invention are to provide pillar members for a cowl which are extended frontwardly below the window opening to join the sides of the cowl panel; to provide a cowl, constructed to form the pillar finish elements which engage pillar members at the window opening, and which has its sides engaged therebelow by extensions of said member; to provide a rabbet in the side of the cowl having a slope substantially the same as that of the pillar finish element which engages the extension of the pillar element below the window opening to add materially to the strength of the pillar; and to provide a cowl having a pillar for sloping door openings with a reinforcing member which is simple in construction, which materially increases the strength of the structure and which is economical of manufacture.

Other objects and features of novelty of my invention will be either specifically pointed out or will become apparent when referring for a better understanding of my invention, to the following description taken in conjunction with the accompanying drawing, wherein:

Figure 1 is a sectional view of a vehicle body cowl construction which embodies features of my invention;

Fig. 2 is a sectional view of the structure illustrated in Fig. 1, taken on the line 2—2 thereof, and Fig. 3 is a sectional view of the structure illustrated in Fig. 1 taken on the line 3—3 thereof.

Referring to Fig. 1, I have illustrated a cowl panel 6 which is made up in accordance with the method employed in the above mentioned Vehko application, being constructed of two side panel elements 7 and a top or interconnecting panel element 8 which are joined together along the lines 9 by a welding operation. The side panels 7 are preformed to constitute pillar finish elements 11 which extend along the door opening and slant frontwardly from the top of the vehicle. Suitable rabbets 12 are provided in the finish elements while rabbets 13 are formed therein at the windshield opening for receiving the windshield frame. An additional rabbet 14 is formed in the cowl in either side of its center line for receiving the hood of the vehicle, the rabbets being arcuate in shape and substantially following the slope of the door to add to the strength and beauty of the finished vehicle.

A pillar member 15 is secured along each inner edge of the pillar finish elements, as illustrated in Fig. 2. The pillar member 15 at the windshield opening is of channel form, as illustrated in Fig. 2, and is united to the finish elements preferably by a welding operation. Below the window opening, the pillar member 15 has the frontwardly disposed flange of the channel section extended frontwardly of the door opening, at 16, and then flanged at 17 to join the inner surface of the rabbet 14, as illustrated in Fig. 3. The flange 17 is welded or otherwise secured to the cowl panel along the curved slope of the rabbet, as illustrated in Fig. 1. A tacking strip 18 which extends the entire length of the pillar at the door opening, is secured to the channel section of the pillar member 15 by screws, or other suitable means such as extending tongues, which may be flanged over the tacking strip to retain it in firm fixed relation to the member. The pillar member at the top is flanged outwardly, as at 19, to be welded or otherwise secured to a plate 21 between which, and the extension of the door pillar 22, the roof rail 23 is secured by bolts 24.

The pillar and cowl structure thus formed is exceedingly simple in construction and economical to manufacture and at the same time has embodied therein a maximum degree of strength. The pillar at the windshield opening may be of exceedingly thin section, as illustrated in Fig. 3, to eliminate interference with the vision of the operator and to provide a neat appearance to the finished body. It is to be understood that suitable flanges 25, 26 and 27 are provided on the lower edge of the reinforcing member to be secured by a welding, a bolting or a riveting operation to the body frame, the toe board support and to the dash, to further strengthen the construction.

While I have described and illustrated but a single embodiment of my invention, it will be apparent to those skilled in the art that various changes, omissions, additions and substitutions may be made therein without departing from the spirit and scope of my invention, as set forth in the accompanying claims.

I claim:

1. A cowl panel preformed to include the pillar finish elements at the windshield opening, said elements being extended laterally along with the cowl to form the door jambs, and pillar members nested in said finish elements at the window opening, and extended to engage the sides of said cowl to form a box section structure therewith.

2. A cowl panel preformed to include the pillar finish elements at the windshield opening, said elements being extended laterally along with the cowl to form the door jambs, and pillar members, of outwardly presented channel section nested in said pillar at the window opening and extended laterally therebelow to engage the body of the cowl.

3. A cowl panel preformed at the door opening to form pillar finish elements having door jamb faces thereon and further extended and preformed at the windshield opening to form a rabbet therefor, and pillar members for said elements secured to the door jambs, to the rabbets at the windshield openings and to the main portions of the cowl body.

4. A cowl panel preformed to include the pillar finish elements at the windshield openings and extending downwardly and inwardly to form the jamb faces of the door, and pillar members secured along the length of said elements to the inner surface of the door jamb and extending frontwardly of the jamb below the windshield opening and secured to the body portion of the cowl.

5. A cowl panel having upwardly projecting pillar finish elements at the sides of the windshield opening which are extended laterally of the elements and body portion of the cowl to form door jamb faces, the body portion of the cowl being provided with rabbets substantially following the slope of the door jamb faces, and pillar members nested in said elements at the windshield opening and secured thereto and to door jamb faces and projecting frontwardly of the jamb below the windshield opening and secured to the cowl adjacent to the rabbets.

6. A cowl panel having upwardly projecting pillar finish elements at the sides of the windshield opening which are extended laterally of the elements and body portion of the cowl to form door jamb faces, the body portion of the cowl being provided with rabbets substantially following the slope of the door jamb faces, pillar members nested in the projections at the windshield opening and secured thereto and to the door jamb faces and projecting frontwardly of the jamb below the windshield opening and secured to the cowl adjacent to the rabbet, and flanges provided on the pillar members at their upper and lower ends.

OTTO F. GRAEBNER.